US008920281B2

(12) United States Patent
Mellet et al.

(10) Patent No.: US 8,920,281 B2

(45) **Date of Patent: *Dec. 30, 2014**

(54) MULTI-SPEED TRANSMISSION

(71) Applicant: GM Global Technology Operations LLC, Detroit, MI (US)

(72) Inventors: Edward W. Mellet, Rochester Hills, MI (US); James M. Hart, Belleville, MI (US); Andrew W. Phillips, Rochester, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 126 days.

This patent is subject to a terminal disclaimer.

(21) Appl. No.: 13/670,987

(22) Filed: Nov. 7, 2012

(65) Prior Publication Data

US 2014/0128200 A1 May 8, 2014

(51) Int. Cl.

*F16H 1/32* (2006.01)
*F16H 3/66* (2006.01)

(52) U.S. Cl.

CPC .......... *F16H 3/66* (2013.01); *F16H 2200/0069* (2013.01); *F16H 2200/2012* (2013.01); *F16H 2200/2046* (2013.01); *F16H 2200/0078* (2013.01)

USPC ........... 475/278; 475/284; 475/288; 475/323; 475/330

(58) Field of Classification Search

CPC ..... F16H 3/62; F16H 3/70; F16H 2200/2012; F16H 2200/2046

USPC ......... 475/269, 275, 278, 284, 288, 296, 330, 475/323

See application file for complete search history.

(56) References Cited

U.S. PATENT DOCUMENTS

| | | | | |
|---|---|---|---|---|
| 6,991,578 | B2 | 1/2006 | Ziemer | |
| 7,011,597 | B2 | 3/2006 | Haka | |
| 7,018,319 | B2 | 3/2006 | Ziemer | |
| 7,691,024 | B2 * | 4/2010 | Phillips et al. | 475/276 |
| 7,704,181 | B2 * | 4/2010 | Phillips et al. | 475/275 |
| 7,771,306 | B2 * | 8/2010 | Phillips et al. | 475/284 |
| 7,887,454 | B2 * | 2/2011 | Phillips et al. | 475/275 |
| 7,914,414 | B2 * | 3/2011 | Phillips et al. | 475/276 |
| 7,980,988 | B2 * | 7/2011 | Phillips et al. | 475/284 |
| 8,007,395 | B2 * | 8/2011 | Wittkopp et al. | 475/275 |
| 8,038,565 | B2 * | 10/2011 | Phillips et al. | 475/276 |
| 8,052,567 | B2 * | 11/2011 | Hart et al. | 475/282 |
| 8,057,349 | B2 * | 11/2011 | Phillips et al. | 475/275 |
| 8,251,859 | B2 * | 8/2012 | Gumpoltsberger et al. | 475/284 |
| 8,512,196 | B2 * | 8/2013 | Mellet et al. | 475/275 |
| 8,517,885 | B2 * | 8/2013 | Shim et al. | 475/276 |
| 8,523,729 | B2 * | 9/2013 | Hart et al. | 475/282 |
| 2009/0017976 | A1 * | 1/2009 | Phillips et al. | 475/276 |
| 2009/0017978 | A1 * | 1/2009 | Phillips et al. | 475/276 |

* cited by examiner

*Primary Examiner* — David D Le

(57) ABSTRACT

A transmission has an input member, an output member, at least four planetary gear sets, a plurality of coupling members and a plurality of torque transmitting devices. Each of the planetary gear sets includes first, second and third members. The torque transmitting devices include clutches and brakes actuatable in combinations of three to establish a plurality of forward gear ratios and one reverse gear ratio.

16 Claims, 2 Drawing Sheets

| GEAR STATE | GEAR RATIO | RATIO STEP | TORQUE TRANSMITTING MEMBERS | | | | | |
|---|---|---|---|---|---|---|---|---|
| | | | 36 | 34 | 32 | 26 | 28 | 30 |
| REV | -4.801 | | X | | X | X | | |
| N | | -1.45 | | | | | | |
| 1ST | 3.300 | | X | X | | X | | |
| 2ND | 1.998 | 1.65 | X | | | X | X | |
| 3RD | 1.348 | 1.48 | | X | | X | X | |
| 4TH | 1.143 | 1.18 | | X | | X | | X |
| 5TH | 1.000 | 1.14 | | | | X | X | X |
| 6TH | 0.849 | 1.18 | | | X | X | | X |
| 7TH | 0.732 | 1.16 | | | X | X | X | |
| 8TH | 0.655 | 1.12 | | | X | | X | X |
| 9TH | 0.556 | 1.18 | | X | X | | X | |
| 10TH | 0.472 | 1.18 | | X | X | | | X |

X = ON - ENGAGED CARRYING TORQUE

FIG. 3

| GEAR STATE | GEAR RATIO | RATIO STEP | TORQUE TRANSMITTING MEMBERS | | | | | |
|---|---|---|---|---|---|---|---|---|
| | | | 36 | 34 | 32 | 26 | 28 | 30 |
| REV | -4.801 | | X | | X | X | | |
| N | | -1.45 | | | | | | |
| 1ST | 3.300 | | X | X | | X | | |
| 2ND | 1.998 | 1.65 | X | | | X | X | |
| 3RD | 1.510 | 1.32 | X | | | X | | X |
| 4TH | 1.361 | 1.11 | X | X | X | | | |
| 5TH | 1.348 | 1.01 | | X | | X | X | |
| 6TH | 1.143 | 1.18 | | X | | X | | X |
| 7TH | 1.000 | 1.14 | | | | X | X | X |
| 8TH | 0.849 | 1.18 | | | X | X | | X |
| 9TH | 0.732 | 1.16 | | | X | X | X | |
| 10TH | 0.655 | 1.12 | | | X | | X | X |
| 11TH | 0.556 | 1.18 | | X | X | | X | |
| 12TH | 0.472 | 1.18 | | X | X | | | X |

X = ON - ENGAGED CARRYING TORQUE

FIG. 4

MULTI-SPEED TRANSMISSION

FIELD

The invention relates generally to a multiple speed transmission having a plurality of planetary gear sets and a plurality of torque transmitting devices and more particularly to a transmission having ten or more speeds, at least four planetary gear sets and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, four planetary gear sets, a plurality of coupling members and a plurality of torque transmitting devices. Each of the planetary gear sets includes first, second and third members. The torque transmitting devices are for example clutches and brakes.

In another embodiment of the present invention, a first interconnecting member continuously interconnects interconnecting the first member of the first planetary gear set with the first member of the third planetary gear set.

In yet another embodiment of the present invention, a second interconnecting member continuously interconnects the third member of the first planetary gear set with the first member of the second planetary gear set.

In yet another embodiment of the present invention, a third interconnecting member continuously interconnects the third member of the second planetary gear set with the third member of the third planetary gear set.

In yet another embodiment of the present invention, a fourth interconnecting member continuously interconnects the second member of the third planetary gear set with the third member of the fourth planetary gear set.

In still another embodiment of the present invention, a first of the six torque transmitting mechanisms is selectively engageable to interconnect the first member of the first planetary gear set and the first member of the third planetary gear set with the input member and the second member of the fourth planetary gear set.

In still another embodiment of the present invention, a second of the six torque transmitting mechanisms is selectively engageable to interconnect the third member of the first planetary gear set and the first member of the second planetary gear set with the second member of the third planetary gear set and the third member of the fourth planetary gear set.

In still another embodiment of the present invention, a third of the six torque transmitting mechanisms is selectively engageable to interconnect the second member of the second planetary gear set with the second member of the third planetary gear set and the third member of the fourth planetary gear set.

In still another embodiment of the present invention, a fourth of the six torque transmitting mechanisms is selectively engageable to interconnect the first member of the fourth planetary gear set with the stationary member.

In still another embodiment of the present invention, a fifth of the six torque transmitting mechanisms is selectively engageable to interconnect the third member of the second planetary gear set and the third member of the third planetary gear set with the stationary member.

In still another embodiment of the present invention, a sixth of the six torque transmitting mechanisms is selectively engageable to interconnect the second member of the second planetary gear set with the stationary member.

In still another embodiment of the present invention, the input member is continuously connected for common rotation with the second member of the fourth planetary gear set.

In still another embodiment of the present invention, the output member is continuously connected for common rotation with the second member of the first planetary gear set.

In still another embodiment of the present invention, the first member of the first planetary gear set, the third member of the second planetary gear set, the third member of the third planetary gear set and the first member of the fourth planetary gear set are sun gears, the second members of the first, second, third and fourth planetary gear sets are carrier members and the third member of the first planetary gear set, the first member of the second planetary gear set, the first member of the third planetary gear set and the third member of the third planetary gear set are ring gears.

In still another embodiment of the present invention, the torque transmitting mechanisms are selectively engageable in combinations of at least three to establish a plurality of forward speed ratios, for example up to twelve, and at least one reverse speed ratio between the input member and the output member.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

Figure 1:
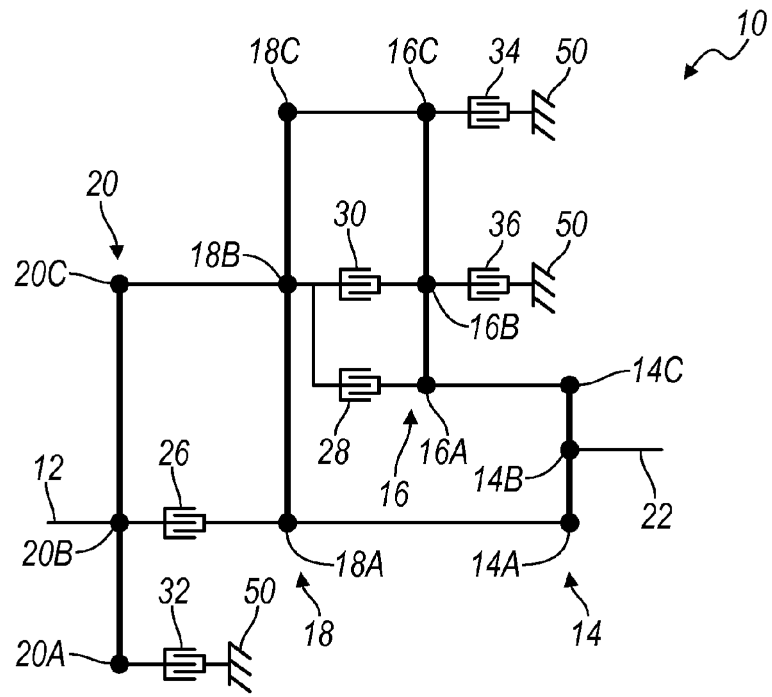
FIG. 1 is a lever diagram of an embodiment of a multi-speed transmission according to the present invention.
Figure 2:
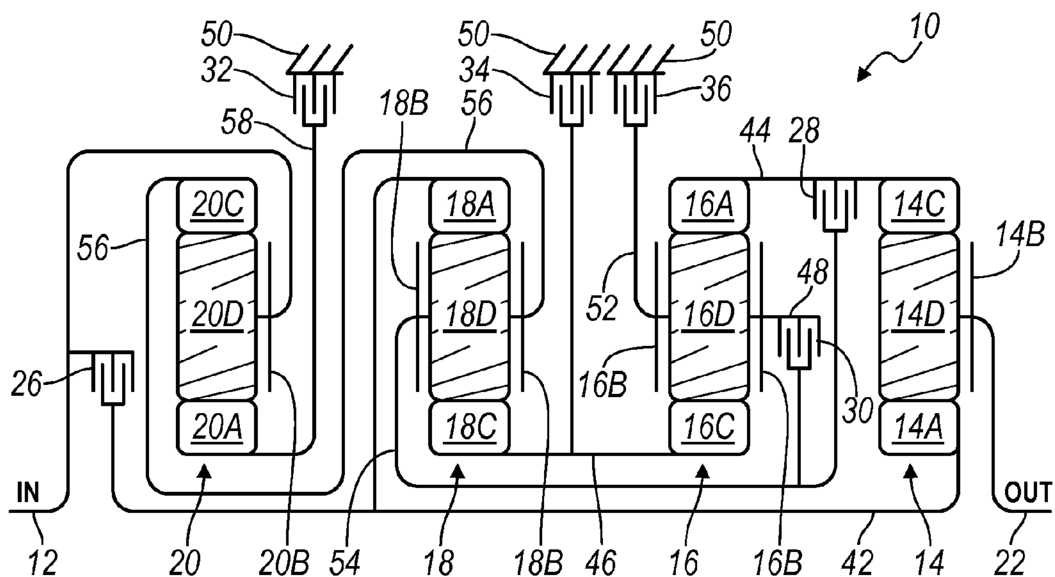
FIG. 2 is a diagrammatic illustration of an embodiment of a multi-speed transmission according to the present invention.

FIG. 3 is a truth table presenting the state of engagement of the various torque transmitting elements in each of the available ten forward speeds and one reverse speed or gear ratios of the transmissions illustrated in FIGS. 1 and 2; and FIG. 4 is a truth table presenting the state of engagement of the various torque transmitting elements in each of the available twelve forward speeds and reverse speed or gear ratios of the transmissions illustrated in FIGS. 1 and 2.

DETAILED DESCRIPTION

The following description is merely exemplary in nature and is not intended to limit the present disclosure, application, or uses.

At the outset, it should be appreciated that the embodiments of the multi-speed automatic transmission of the present invention has an arrangement of permanent mechanical connections between the elements of the four planetary gear sets. A first component or element of a first planetary gear set is permanently coupled to a first component or element of the third planetary gear set. A third component or element of the first planetary gear set is permanently coupled a first component or element of the second planetary gear set. A third component or element of the second planetary gear set is permanently coupled to a third component or element of the third planetary gear set. A second component or element of the third planetary gear set is permanently coupled to a third component or element of the fourth planetary gear set.

Referring now to FIG. 1, an embodiment of a ten speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, “The Lever Analogy: A New Tool in Transmission Analysis” by Benford and Leising which is hereby fully incorporated by reference.

The transmission 10 includes an input shaft or member 12, a first planetary gear set 14, a second planetary gear set 16, a third planetary gear set 18 and a fourth planetary gear set 20 and an output shaft or member 22. In the lever diagram of FIG. 1, the first planetary gear set 14 has three nodes: a first node 14A, a second node 14B and a third node 14C. The second planetary gear set 16 has three nodes: a first node 16A, a second node 16B and a third node 16C. The third planetary gear set 18 has three nodes: a first node 18A, a second node 18B and a third node 18C. The fourth planetary gear set 20 has three nodes: a first node 20A, a second node 20B and a third node 20C.

The input member 12 is continuously coupled to the second node 20B of the fourth planetary gear set 20. The output member 22 is coupled to the second node 14B of the first planetary gear set 14. The first node 14A of the first planetary gear set 14 is coupled to the first node 18A of the third planetary gear set 18. The third node 14C of the first planetary gear set 14 is coupled to the second node 16A of the second planetary gear set 16. The third node 16C of the second planetary gear set 16 is coupled to the third node 18C of the third planetary gear set 18. The second node 18B of the third planetary gear set 18 is coupled to third node 20C of the fourth planetary gear set 20.

A first clutch 26 selectively connects the input member or shaft 12 and the second node 20B of the fourth planetary gear set 20 with the first node 14A of the first planetary gear set 14 and the first node 18A of the third planetary gear set 18. A second clutch 28 selectively connects the first node 16A of the second planetary gear set 16 and the third node 14C of the first planetary gear set 14 with the second node 18B of the third planetary gear set 18 and the third node 20C of the fourth planetary gear set 20. A third clutch 30 selectively connects the second node 16B of the second planetary gear set 16 with the second node 18B of the third planetary gear set 18 and the third node 20C of the fourth planetary gear set 20. A first brake 32 selectively connects the first node 20A of the fourth planetary gear set 20 with a stationary member or transmission housing 50. A second brake 34 selectively connects the third node 16C of the second planetary gear set 16 and the third node 18C of the third planetary gear set 18 with the stationary member or transmission housing 50. A third brake 36 selectively connects the second node 16B of the second planetary gear set 16 with the stationary member or transmission housing 50.

Referring now to FIG. 2, a stick diagram presents a schematic layout of an embodiment of the ten speed transmission 10 according to the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

For example, the planetary gear set 14 includes a sun gear member 14A, a ring gear member 14C and a planet gear carrier member 14B that rotatably supports a set of planet gears 14D (only one of which is shown). The sun gear member 14A is connected for common rotation with a first shaft or interconnecting member 42. The ring gear member 14C is connected for common rotation with a second shaft or interconnecting member 44. The planet carrier member 14B is connected for common rotation with the output shaft or member 22. The planet gears 14D are each configured to intermesh with both the sun gear member 14A and the ring gear member 14C.

The planetary gear set 16 includes a sun gear member 16C, a ring gear member 16A and a planet gear carrier member 16B that rotatably supports a set of planet gears 16D (only one of which is shown). The sun gear member 16C is connected for common rotation with a third shaft or interconnecting member 46. The ring gear member 16A is connected for common rotation with the second shaft or interconnecting member 44. The planet carrier member 16B is connected for common rotation with a fourth shaft or interconnecting member 48 and a fifth shaft or interconnecting member 52. The planet gears 16D are each configured to intermesh with both the sun gear member 16C and the ring gear member 16A.

The planetary gear set 18 includes a sun gear member 18C, a ring gear member 18A and a planet gear carrier member 18B that rotatably supports a set of planet gears 18D (only one of which is shown). The sun gear member 18C is connected for common rotation with the third shaft or interconnecting member 46. The ring gear member 18A is connected for common rotation with the first shaft or interconnecting member 42. The planet carrier member 18B is connected for common rotation with a sixth shaft or interconnecting member 54 and with a seventh shaft or interconnecting member 56. The planet gears 18D are each configured to intermesh with both the sun gear member 18C and the ring gear member 18A.

The planetary gear set 20 includes a sun gear member 20A, a ring gear member 20C and a planet gear carrier member 20B that rotatably supports a set of planet gears 20D (only one of which is shown). The sun gear member 20A is connected for common rotation with an eighth shaft or interconnecting member 58. The ring gear member 20C is coupled to the seventh shaft or interconnecting member 56. The planet carrier member 20B is connected for common rotation with the input shaft or member 12. The planet gears 20D are each configured to intermesh with both the sun gear member 20A and the ring gear member 20C.

The input shaft or member 12 is continuously connected to an engine (not shown) or to a turbine of a torque converter (not shown). The output shaft or member 22 is continuously connected with the final drive unit or transfer case (not shown).

The torque-transmitting mechanisms or clutches 26, 28, 30 and brakes 32, 34 and 36 allow for selective interconnection of the shafts or interconnecting members, members of the planetary gear sets and the housing. For example, the first clutch 26 is selectively engageable to connect the input shaft or member 12 with the first shaft or interconnecting member 42. The second clutch 28 is selectively engageable to connect the second shaft or interconnecting member 44 with the sixth shaft or interconnecting member 54. The third clutch 30 is selectively engageable to connect the fourth shaft or interconnecting member 48 with the sixth shaft or interconnecting member 54. The first brake 32 is selectively engageable to connect the eighth shaft or interconnecting member 58 with the stationary element or the transmission housing 50 in order to restrict the member 58 from rotating relative to the transmission housing 50. The second brake 34 is selectively engageable to connect the third shaft or interconnecting member 46 with the stationary element or the transmission housing 50 in order to restrict the member 46 from rotating relative to the transmission housing 50. The third brake 36 is selectively engageable to connect the fifth shaft or interconnecting member 52 with the stationary element or the transmission housing 50 in order to restrict the member 52 from rotating relative to the transmission housing 50.

Referring now to FIG. 2 and FIG. 3, the operation of an embodiment of the ten speed transmission 10 will be described. It will be appreciated that transmission 10 is capable of transmitting torque from the input shaft or member 12 to the output shaft or member 22 in at least ten forward speed or torque ratios and at least one reverse speed or torque ratio. Each forward and reverse speed or torque ratio is attained by engagement of one or more of the torque-transmitting mechanisms (i.e. first clutch 26, second clutch 28, third clutch 30, first brake 32, second brake 34 and third brake 36), as will be explained below. FIG. 3 is a truth table presenting the various combinations of torque-transmitting mechanisms that are activated or engaged to achieve the various gear states. An "X" in the box means that the particular clutch or brake is engaged to achieve the desired gear state. Actual numerical gear ratios of the various gear states are also presented although it should be appreciated that these numerical values are exemplary only and that they may be adjusted over significant ranges to accommodate various applications and operational criteria of the transmission 10. Of course, other gear ratios are achievable depending on the gear diameter, gear teeth count and gear configuration selected.

For example to establish a reverse gear, first clutch 26, first brake 32 and third brake 36 are engaged or activated. The first clutch 26 connects the input shaft or member 12 with the first shaft or interconnecting member 42. The first brake 32 connects the eighth shaft or interconnecting member 58 with the stationary element or the transmission housing 50 in order to restrict the member 58 from rotating relative to the transmission housing 50. The third brake 36 connects the fifth shaft or interconnecting member 52 with the stationary element or the transmission housing 50 in order to restrict the member 52 from rotating relative to the transmission housing 50. Likewise, the ten forward ratios are achieved through different combinations of clutch and brake engagement, as shown in FIG. 3.

It will be appreciated that the foregoing explanation of operation and gear states of the ten speed transmissions 10 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

Referring now to FIG. 4, a truth table presenting the various combinations of torque-transmitting mechanisms that are activated or engaged to achieve twelve forward gear states and one reverse gear state in yet another embodiment of the present invention. An "X" in the box means that the particular clutch or brake is engaged to achieve the desired gear state. Exemplary gear ratios of the gear states are also presented, although it should be appreciated that these numerical values may be adjusted over significant ranges to accommodate various applications and operational criteria of the transmission 10. As an example, the eleventh gear state is achieved through the engagement of second clutch 28, first brake 32 and second brake 34 and the twelfth gear state is achieved through the engagement of third clutch 30, first brake 32 and second brake 34. The second clutch 28 connects the second shaft or interconnecting member 44 with the sixth shaft or interconnecting member 54. The first brake 32 connects the eighth shaft or interconnecting member 58 with the stationary element or the transmission housing 50 in order to restrict the member 58 from rotating relative to the transmission housing 50. The second brake 34 connects the third shaft or interconnecting member 46 with the stationary element or the transmission housing 50 in order to restrict the member 46 from rotating relative to the transmission housing 50. The third clutch 30 connects the fourth shaft or interconnecting member 48 with the sixth shaft or interconnecting member 54. The other forward gear ratios and reverse gear ratio are established according to the engagement scheme specified in the table of FIG. 4

The description of the invention is merely exemplary in nature and variations that do not depart from the gist of the invention are intended to be within the scope of the invention. Such variations are not to be regarded as a departure from the spirit and scope of the invention.

The invention claimed is:

1. A transmission comprising:

an input member;

an output member;

first, second, third and fourth planetary gear sets each having first, second and third members;

four interconnecting members continuously interconnecting a member of the first, second, third and fourth planetary gear sets with another member of the first, second, third and fourth planetary gear sets; and six torque transmitting mechanisms, wherein three of the six torque transmitting mechanisms are each selectively engageable to interconnect at least one of the first, second and third members of one of the planetary gear sets with at least one other of the first, second, third members of another planetary gear set and another three of the six torque transmitting mechanisms are each selectively engageable to interconnect at least one of the first, second and third members of one of the planetary gear sets with a stationary member, and wherein the six torque transmitting mechanisms are selectively engageable in combinations of at least three to establish a plurality of forward speed ratios and at least one reverse speed ratio between the input member and the output member, a first of the six torque transmitting mechanisms is selectively engageable to interconnect the first member of the first planetary gear set and the first member of the third planetary gear set with the input member and the second member of the fourth planetary gear set, a second of the six torque transmitting mechanisms is selectively engageable to interconnect the third member of the first planetary gear set and the first member of the second planetary gear set with the second member of the third planetary gear set and the third member of the fourth planetary gear set, a third of the six torque transmitting mechanisms is selectively engageable to interconnect the second member of the second planetary gear set with the second member of the third planetary gear set and the third member of the fourth planetary gear set, a fourth of the six torque transmitting mechanisms is selectively engageable to interconnect the first member of the fourth planetary gear set with the stationary member, and a fifth of the six torque transmitting mechanisms is selectively engageable to interconnect the third member of the second planetary gear set and the third member of the third planetary gear set with the stationary member.

2. The transmission of claim 1 wherein the four interconnecting members further comprises a first interconnecting member continuously interconnecting the first member of the first planetary gear set with the first member of the third planetary gear set, a second interconnecting member continuously interconnecting the third member of the first planetary gear set with the first member of the second planetary gear set, a third interconnecting member continuously interconnecting the third member of the second planetary gear set with the third member of the third planetary gear set, and a fourth interconnecting member continuously interconnecting the second member of the third planetary gear set with the third member of the fourth planetary gear set.

3. The transmission of claim 1 wherein a sixth of the six torque transmitting mechanisms is selectively engageable to interconnect the second member of the second planetary gear set with the stationary member.

4. The transmission of claim 1 wherein the input member is continuously connected for common rotation with the second member of the fourth planetary gear set.

5. The transmission of claim 1 wherein the output member is continuously connected for common rotation with the second member of the first planetary gear set.

6. The transmission of claim 1 wherein the first member of the first planetary gear set, the third member of the second planetary gear set, the third member of the third planetary gear set and the first member of the fourth planetary gear set are sun gears, the second members of the first, second, third and fourth planetary gear sets are carrier members and the third member of the first planetary gear set, the first member of the second planetary gear set, the first member of the third planetary gear set and the third member of the fourth planetary gear set are ring gears.

7. A transmission comprising:

an input member;

an output member;

first, second, third and fourth planetary gear sets each having first, second and third members, and wherein the output member is continuously connected for common rotation with the second member of the first planetary gear set;

a first interconnecting member continuously interconnecting the first member of the first planetary gear set with the first member of the third planetary gear set;

a second interconnecting member continuously interconnecting the third member of the first planetary gear set with the first member of the second planetary gear set;

a third interconnecting member continuously interconnecting the third member of the second planetary gear set with the third member of the third planetary gear set;

a fourth interconnecting member continuously interconnecting the second member of the third planetary gear set with the third member of the fourth planetary gear set; and six torque transmitting mechanisms, wherein three of the six torque transmitting mechanisms are each selectively engageable to interconnect at least one of the first, second and third members of one of the planetary gear sets with at least one other of the first, second, third members of another planetary gear set and another three of the six torque transmitting mechanisms are each selectively engageable to interconnect at least one of the first, second and third members of one of the planetary gear sets with a stationary member, and wherein the six torque transmitting mechanisms are selectively engageable in combinations of at least three to establish at least ten forward speed ratios and at least one reverse speed ratio between the input member and the output member.

8. The transmission of claim 7 a first of the six torque transmitting mechanisms is selectively engageable to interconnect the first member of the first planetary gear set and the first member of the third planetary gear set with the input member and the second member of the fourth planetary gear set.

9. The transmission of claim 8 wherein a second of the six torque transmitting mechanisms is selectively engageable to interconnect the third member of the first planetary gear set and the first member of the second planetary gear set with the second member of the third planetary gear set and the third member of the fourth planetary gear set.

10. The transmission of claim 9 wherein a third of the six torque transmitting mechanisms is selectively engageable to interconnect the second member of the second planetary gear set with the second member of the third planetary gear set and the third member of the fourth planetary gear set.

11. The transmission of claim 10 wherein a fourth of the six torque transmitting mechanisms is selectively engageable to interconnect the first member of the fourth planetary gear set with the stationary member.

12. The transmission of claim 11 wherein a fifth of the six torque transmitting mechanisms is selectively engageable to interconnect the third member of the second planetary gear set and the third member of the third planetary gear set with the stationary member.

13. The transmission of claim 12 wherein a sixth of the six torque transmitting mechanisms is selectively engageable to interconnect the second member of the second planetary gear set with the stationary member.

14. The transmission of claim 7 wherein the input member is continuously connected for common rotation with the second member of the fourth planetary gear set.

15. The transmission of claim 7 wherein the first member of the first planetary gear set, the third member of the second planetary gear set, the third member of the third planetary gear set and the first member of the fourth planetary gear set are sun gears, the second members of the first, second, third and fourth planetary gear sets are carrier members and the third member of the first planetary gear set, the first member of the second planetary gear set, the first member of the third planetary gear set and the third member of the fourth planetary gear set are ring gears.

16. A transmission comprising:

an input member;

an output member;

first, second, third and fourth planetary gear sets each having a sun gear, a carrier member and a ring gear, wherein the input member is continuously connected for common rotation with the carrier member of the fourth planetary gear set, and wherein the output member is continuously connected for common rotation with the carrier member of the first planetary gear set;

a first interconnecting member continuously interconnecting the sun gear of the first planetary gear set with the ring gear of the third planetary gear set;

a second interconnecting member continuously interconnecting the ring gear of the first planetary gear set with the ring gear of the second planetary gear set;

a third interconnecting member continuously interconnecting the sun gear of the second planetary gear set with the sun gear of the third planetary gear set;

a fourth interconnecting member continuously interconnecting the carrier member of the third planetary gear set with the ring gear of the fourth planetary gear set;

a first torque transmitting mechanism selectively engageable to interconnect the sun gear of the first planetary gear set with the input member and the carrier member of the fourth planetary gear set;

a second torque transmitting mechanism selectively engageable to interconnect the ring gear of the first planetary gear set and the ring gear of the second planetary gear set with the carrier member of the third planetary gear set and the ring gear of the fourth planetary gear set;

a third torque transmitting mechanism selectively engageable to interconnect the carrier member of the second planetary gear set with the carrier member of the third planetary gear set and the ring gear of the fourth planetary gear set;

a fourth torque transmitting mechanism selectively engageable to interconnect the sun gear of the fourth planetary gear set with a stationary member;

a fifth torque transmitting mechanism selectively engageable to interconnect the sun gear of the second planetary gear set and the sun gear of the third planetary gear set with the stationary member; and a sixth torque transmitting mechanism selectively engageable to interconnect the carrier member of the second planetary gear set with the stationary member, and wherein the torque transmitting mechanisms are selectively engageable in combinations of at least three to establish a plurality of forward speed ratios and at least one reverse speed ratio between the input member and the output member.

* * * * *